INVENTOR
Edwin T. Todd
BY
C. H. Dibble
ATTORNEY

Oct. 13, 1959
E. T. TODD
2,908,241
AMPHIBIOUS VEHICLE
Filed Jan. 3, 1955
3 Sheets-Sheet 3
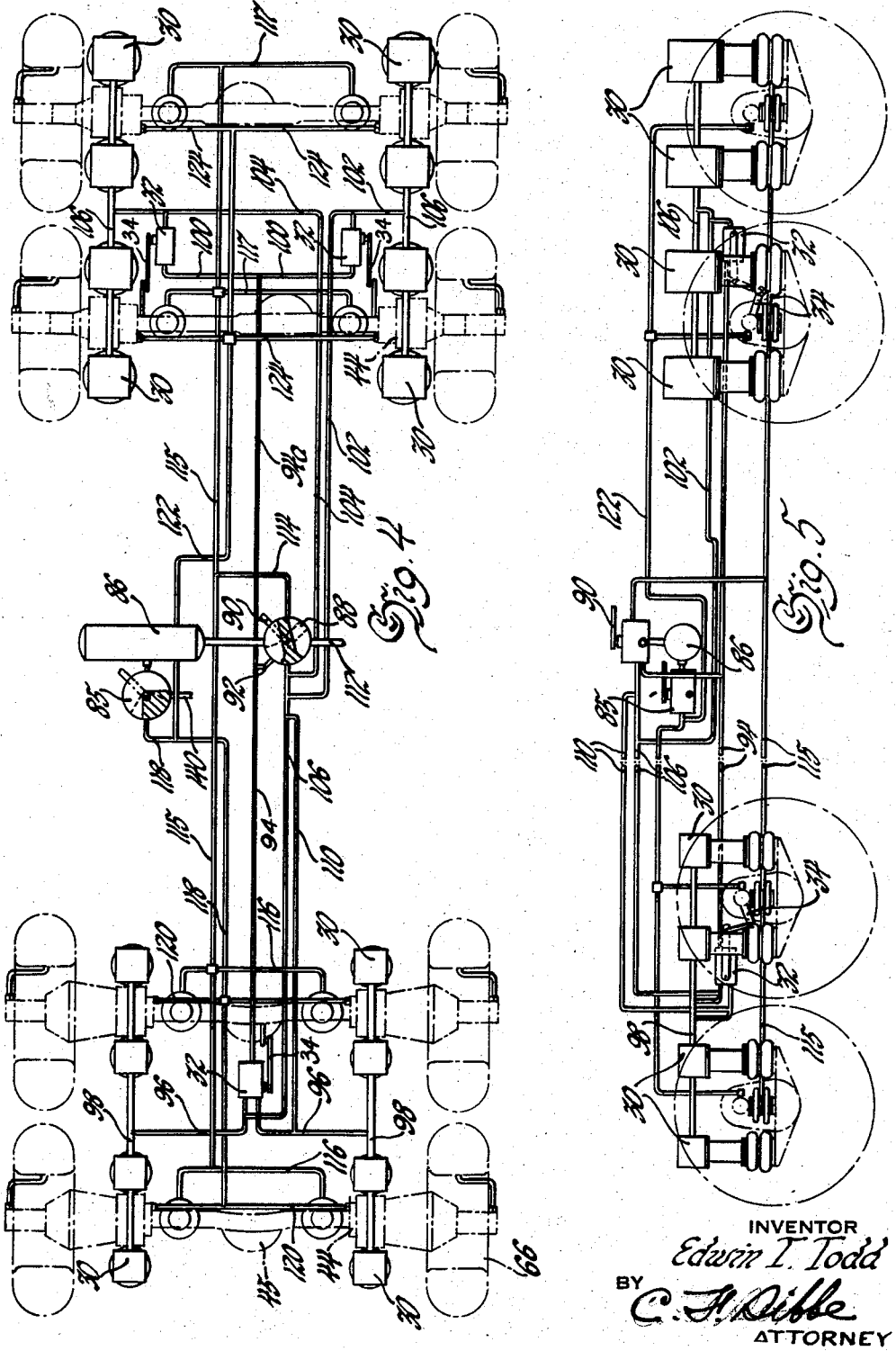
INVENTOR
Edwin T. Todd
BY
ATTORNEY

United States Patent Office 2,908,241
Patented Oct. 13, 1959

2,908,241

AMPHIBIOUS VEHICLE

Edwin T. Todd, Pontiac, Mich., assignor to General Motors Corporation, Detroit, Mich., a corporation of Delaware Application January 3, 1955, Serial No. 479,543

3 Claims. (Cl. 115—1)

This invention relates to a self-propelled vehicle capable of traveling over either land or water and more particularly concerns an amphibious wheeled vehicle having improved operating characteristcs.

The principal object of the invention is to provide a vehicle of the indicated type in which the body or hull portion is air suspended.

Another object is to provide an amphibious vehicle which when afloat exhibits less drag than heretofore experienced.

A still further object is to provide a central tire inflation system for such a vehicle.

Other objects and features of the invention will be apparent from the further description.

In the accompanying drawings illustrating the invention in its preferred embodiment, Fig. 1 shows the vehicle in side elevation;

Fig. 3 is a fragmentary detail illustrating parts involved in the central tire inflation system;

Fig. 4 is a schematic representation in plan showing the air-operated parts, including the controls; and Fig. 5 shows in side elevation parts represented in Fig. 4.

Figure 1:
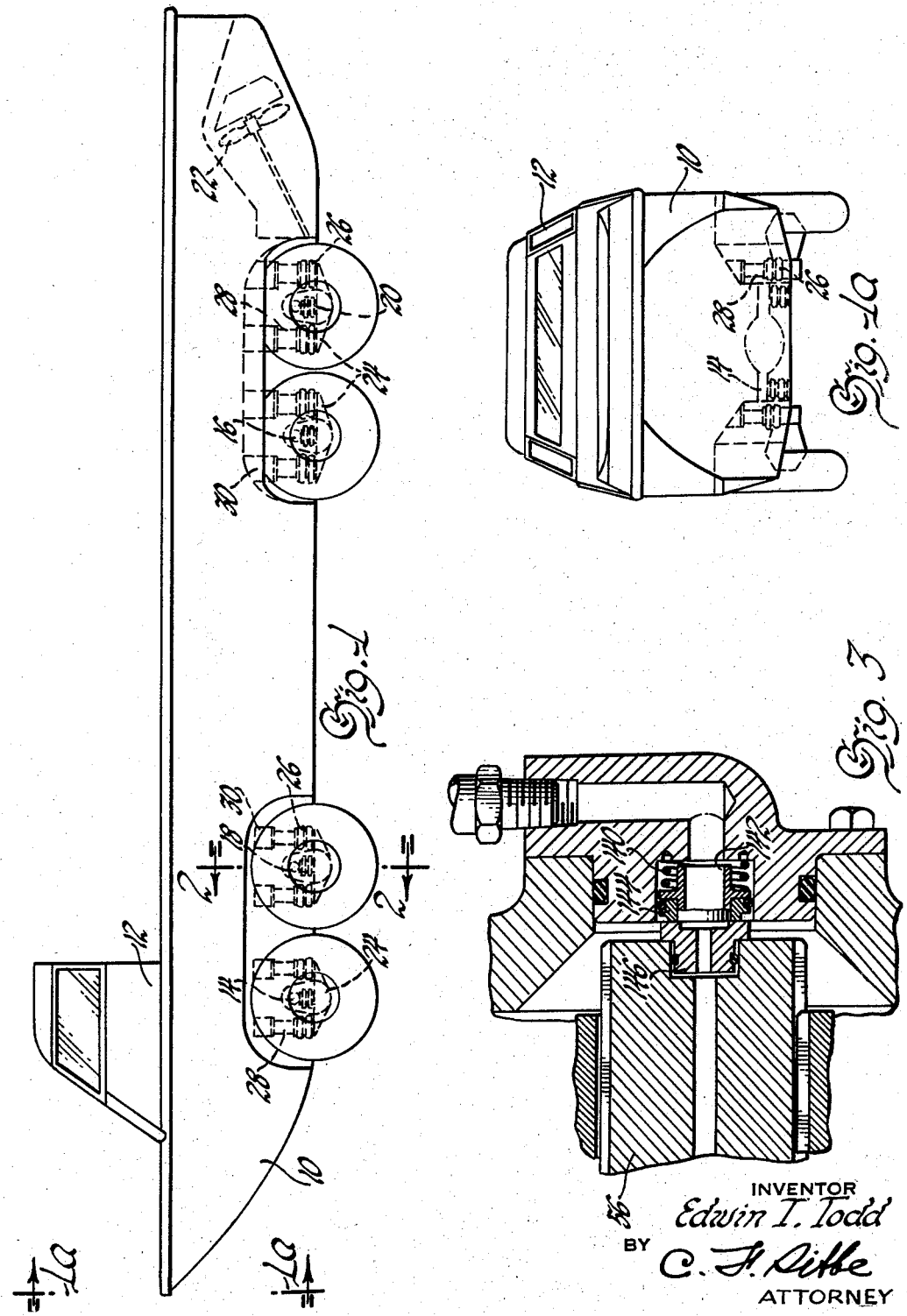
Fig. 1a is a front end elevation.

Referring first to Fig. 1, the numeral 10 indicates the body portion of the vehicle, which is equipped with a cab 12 confining the manual controls. As represented, the vehicle comprises four axles, the axles being grouped in pairs. Although nowise critical so far as the present invention is concerned, employment of two engines is contemplated, one engine driving axles 14 and 16, the other axles 18 and 20. Dual propellers 22 may be driven either by these same engines or, if desired, by a separate power plant or plants.

Each of axles 14, 16, 18, and 20 mounts a beam 24 providing seats for air bellows or springs 26, of which there are two associated with each wheel. The air bellows are linked via hollow rigid connectors 28 to individual air reservoirs 30, fixed to or integrated with the framing of the hull or body 10. The operation of such a suspension system will be found described in U.S. Patent No. 2,691,420 to Fox et al.

In addition to bellows 26, the suspension system includes a plurality of leveling valves 32 (Fig. 4). These are associated with the body of the vehicle and axles 16 and 18 for a purpose which will be made clear by reference to Rossman patent U.S. No. 2,670,201. Suffice it to say here, that these valves served to maintain the body of the vehicle during land travel at a constant level irrespective of load. Each comprises lever arms 34 seen in Fig. 4.

Figure 2:
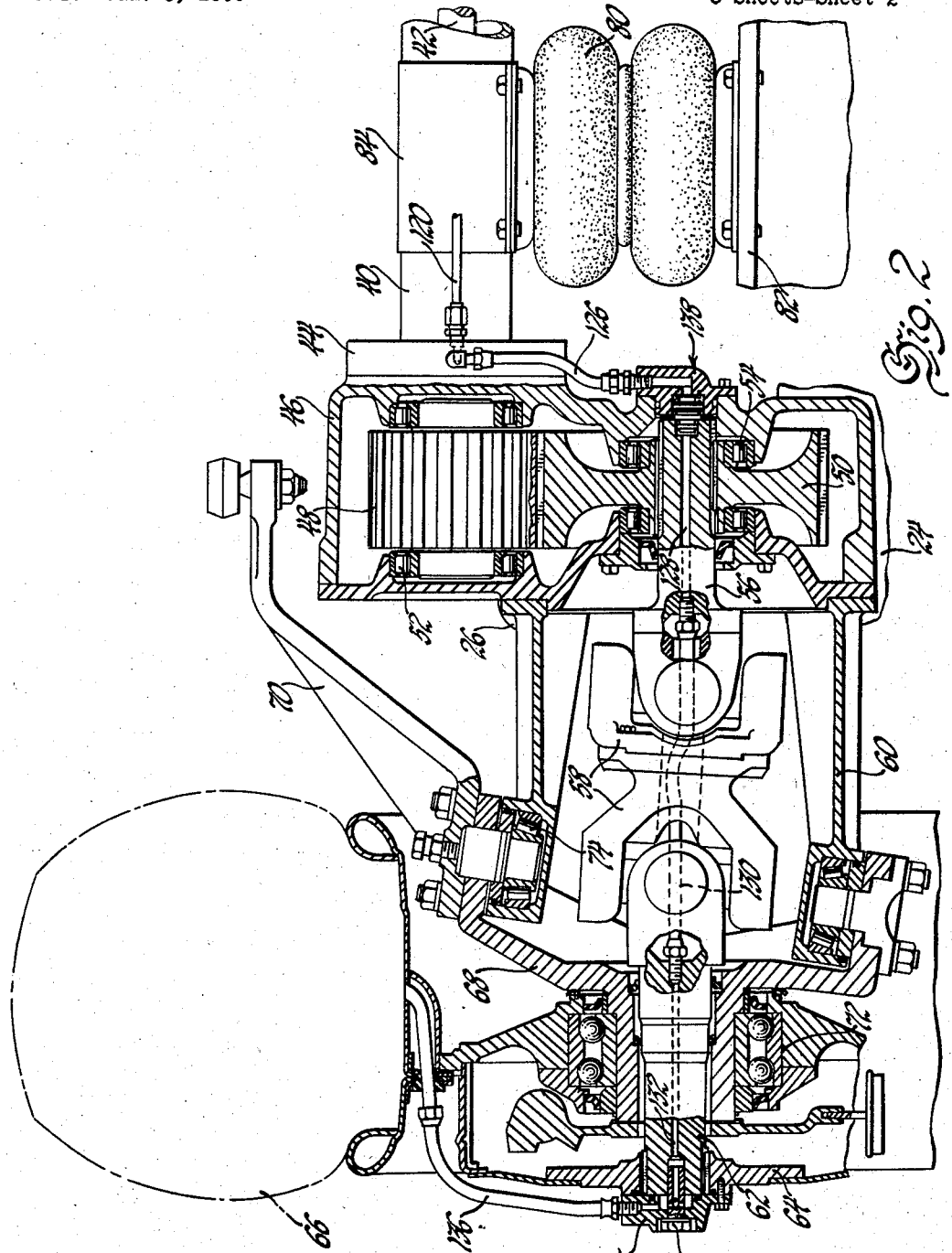
Fig. 2 is a fragmentary detail in elevation, shown partly in section.

The construction of the several axles will be clear from Fig. 2 wherein the numeral 40 denotes the housing for the axle component 42 extending from the differential 45 (Fig. 4). The housing 40 terminates in a flange 44 made fast to a casing 46 housing a reduction unit including gears 48 and 50 turning on bearings 52 and 54, respectively. Shaft 56, which is splined to the gear 50 and hence represents the output of the reduction gearing is connected via a universal joint assembly 58, encased within a housing member 60, to wheel drive shaft 62. The latter is formed at its outer end to provide a spline connection with the wheel 64 mounting a pneumatic tire 66. The particular wheel being steerable, the assembly includes a steering knuckle 68 actuated through a steering arm 70. Bearings 72 and 74 serve an obvious purpose.

Axles of the type represented having a central component positioned at a level higher than the direct wheel drive shafts are known in the art as "drop" axles.

In addition to the previously mentioned suspension bellows 26, there are provided bellows 80, of which there are two associated with each axle. Whereas the bellows or pneumatic motors 26 are supported by the axles so as to suspend the body, the bellows 80 are supported by the body flooring 82 (Fig. 2) under the axle components 42 to the end that, with the vehicle afloat, when air is supplied thereto and air is simultaneously exhausted from the bellows 26, the axles are retracted, markedly reducing drag and substantially increasing the speed of travel of the vehicle in water. As illustrated in Fig. 2, the connection between the bellows 80 and the corresponding axle housings 40 is effected by means of clamps 84 made fast to the housings just inward of the gear reduction units. From the identified figure, it may be incidentally noted that the beams 24 on which the bellows 26 seat are suitably secured to the casings 46 for the reduction units.

It will be understood that the axles mounting the non-steerable wheels may generally conform in construction with Fig. 2 except in point of the steering knuckle which is replaced with a fixed member.

Air required for the operation of the bellows 26 and 80 is derived from a tank 86 in which the air is maintained at a predetermined pressure by a compressor, not shown, powered from one of the engines. Tank 86 also represents the source of air supply for the central tire inflation system shortly to be described and shown as controlled by means of valve 85.

The suspension air supply and the air supply to the retraction bellows 80, is under the control of a two-way valve 88. While this valve is shown centrally positioned in Figs. 3 and 4, it will be understood that it may be located in the cab 12. Alternatively a remote control mechanism may be provided.

With the valve lever 90 in its solid line position, as is the case when the vehicle is traveling over land, the forward air reservoirs are open to the tank 86 via lines 92, 94, the left-hand leveling valve 32, branch lines 96, and connecting lines 98. Similarly, the rearward reservoirs 30 are in open communication with the tank 86 via lines 92, 94a branch lines 100, the leveling valves 32 associated with axle 16, and lines 102, 104.

Lines 102 and 104 will be seen as terminating centrally of the vehicle in a line 106, which extends between the valve and one of the branch lines 96. The other branch line 96 is open to still another line 110, connecting with the line 106 just forward of the connection between lines 102 and 106. These lines 102, 104, 106, and 110 constitute return conduits from the air suspension units to the valve 88, which vents to the atmosphere through a line 112. It will be observed that with the movable element of the valve in its solid line position, flow from the line 106 through the valve and thence to the vent line is blocked.

Valve 88 is connected to the bellows 80 through lines 114, 115 and branch lines 116, 117. These bellows are open to the atmosphere when the movable component of the valve 88 is in its solid line position, i.e. when the vehicle is traveling over land. As the vehicle enters water and starts to float, the movable element of the valve is rotated by the operator to its dotted line position, with the result that the suspension bellows vent to the atmosphere and air is supplied from the tank 86 to the bellows or motors 80 to retract the axles.

Prior to the indicated manipulation of valve 88, the previously mentioned valve 85, which is normally closed, may be opened to admit air from the tank 86 to the pneumatic tires 66, this to gain any possible increase in the buoyancy of the vehicle. Air is fed to the forward tires via a conduit 118 and branch lines 120, while the rear tires are fed via conduit 118, a line 122, connecting with conduit 118 down-stream of the valve 85, and branch lines 124.

Each of the branch lines 120 and 124 terminates at the corresponding axle housing flange 44, where it connects with a flexible conduit 126 (Fig. 2) opening to a bore 128 in the output shaft 56 of the reduction gearing. This bore in turn communicates with a flexible conduit 130 extending through the universal joint 58 and opening to a bore 132 in the wheel drive shaft 62. The connection to the tire is completed by a drilled bolt 134, a drilled cap piece 135 and an outside air line 136.

A suitable seal will be seen provided at 138 just inward of the reduction gearing, where in land travel, at least, relative rotary motion exists between parts through which the air to the tire passes. This seal is illustrated by Fig. 3. From such figure, it will be noted that the seal is of the spring-loaded type, the spring 140 exerting its force against the flange portion of a sleeve 142, which bears against a seal carrying ring 144, the ring in turn abutting a sealing plug 146 accommodated within the inner end of the output shaft 56.

The utility of the central tire inflation scheme in water travel is not limited to the increased buoyancy resulting on the over-inflation. Thus, as the vehicle nears the shore and the tires begin to contact bottom, valve 84 may be turned to connect conduit 118 and a vent line 14, thereby to reduce the tire pressure so as to gain increased traction. The reduced pressure may be substantially less than the pressure at which the tires are normally operated when traveling over ordinary terrain.

In addition to the indicated manipulation of valve 84, it is manifestly necessary that the operator as the vehicle nears the shore turn valve 88 in order to admit air to the suspension bellows and vent the bellows 80.

It will, of course, be immediately appreciated by those skilled in the art that considerable simplification of the air distribution system can be achieved through the use of check valves.

What I claim is:

1. In a vehicle adapted for travel over land or water, a hull, a plurality of axles, ground-engaging wheels on said axles, pneumatic suspension means between said hull and said axles, pneumatic motor means supported by said hull under said axles, a source of pneumatic pressure carried by the vehicle and circuited with said pneumatic suspension means and said pneumatic motor means, and valve means in the pneumatic system for venting said pneumatic suspension means and for charging gas from said source to said pneumatic motor means to retract said axles when the vehicle is afloat.

2. In a vehicle adapted for travel over land or water, a hull, a plurality of axles, ground-engaging wheels on said axles, pneumatic suspension means between said hull and said axles, pneumatic motor means supported by said hull under said axles, a source of pneumatic pressure carried by the vehicle, conduit means extending from said source to said pneumatic suspension means, separate conduit means extending from said source to said pneumatic motor means and valve means common to said conduits having an exhaust outlet whereby with the vehicle afloat said pneumatic suspension means may be deflated and gas charged from said source to said pneumatic motor means to retract said axles.

3. In a vehicle adapted for travel over land or water, a hull, a plurality of axles, ground-engaging wheels on said axles, a plurality of air bags between said hull and each of said axles, a plurality of air bags supported by said hull under each of said axles and serving as pneumatic motors, a source of air pressure carried by the vehicle, a supply conduit extending from said source to said first-mentioned air bags, a second supply conduit extending from said source to said second-mentioned air bags and valve means common to said conduits having an exhaust outlet whereby with the vehicle afloat said first-mentioned air bags may be deflated and air charged to said second-mentioned air bags from said source to retract said axles.

References Cited in the file of this patent
UNITED STATES PATENTS

| | | |
|---|---|---|
| 1,450,197 | Zwickey | Apr. 3, 1923 |
| 2,213,539 | Wiegand | Sept. 3, 1940 |
| 2,399,141 | Quinn | Apr. 23, 1946 |
| 2,560,714 | Bill | July 17, 1951 |
| 2,579,048 | Paul | Dec. 18, 1951 |
| 2,586,218 | Gazda | Feb. 19, 1952 |
| 2,648,546 | Falkenhagen | Aug. 11, 1953 |